(12) United States Patent
O'Neil et al.

(10) Patent No.: US 6,298,456 B1
(45) Date of Patent: Oct. 2, 2001

(54) RUNTIME DETECTION OF NETWORK LOOPS

(75) Inventors: Douglas E. O'Neil, Auburn; Robert Michael McGuire, Roseville, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/160,054

(22) Filed: Sep. 24, 1998

Related U.S. Application Data

(63) Continuation-in-part of application No. 08/986,077, filed on Dec. 9, 1997.

(51) Int. Cl.[7] .................................................. H04B 1/74
(52) U.S. Cl. .................................................. 714/48
(58) Field of Search ................... 714/48, 716; 370/224, 370/234, 249; 709/223

(56) References Cited

U.S. PATENT DOCUMENTS

| | | | |
|---|---|---|---|
| 5,034,945 | * | 7/1991 | Kimoto et al. . |
| 5,084,870 | * | 1/1992 | Hutchison et al. . |
| 5,321,812 | * | 6/1994 | Benedict et al. . |
| 5,506,838 | * | 4/1996 | Flanagan . |
| 5,511,168 | * | 4/1996 | Perlman et al. . |
| 5,535,335 | * | 7/1996 | Cox et al. . |
| 5,727,157 | * | 3/1998 | Orr et al. . |
| 5,729,528 | * | 3/1998 | Salingre et al. . |
| 5,790,522 | * | 8/1998 | Fichou et al. . |
| 5,790,808 | * | 8/1998 | Seaman . |
| 5,944,798 | * | 8/1999 | McCarty et al. ........... 709/251 |
| 5,959,968 | * | 9/1999 | Chin et al. . |
| 6,021,116 | * | 2/2000 | Chiussi et al. . |
| 6,044,090 | * | 3/2000 | Grau et al. . |

* cited by examiner

Primary Examiner—Paul R. Myers

(57) ABSTRACT

Runtime detection of network loops is performed. It is detected when for a network segment a ratio of duplicate packets to total packets exceeds a first predetermined threshold. Also it is detected when traffic load on the network segment exceeds a second predetermined threshold. When the ratio of duplicate packets to total packets exceeds the first predetermined threshold and the traffic load on the network segment exceeds the second predetermined threshold, a network loop has been detected.

19 Claims, 4 Drawing Sheets

RUNTIME DETECTION OF NETWORK LOOPS

CROSS REFERENCE TO RELATED APPLICATION

This application is a continuation-in-part of application Ser. No. 08/986,077, filed Dec. 5, 1997, by Craig A. VanZante, Robert L. Faulk, Jr. and Douglas E. O'Neil for HUB-EMBEDDED SYSTEM FOR AUTOMATED NETWORK FAULT DETECTION AND ISOLATION.

BACKGROUND

The present invention concerns computer networks and pertains particularly to runtime detection of network loops.

A local area network (LAN) segment can include repeaters, end stations, and network cabling. For example, the Ethernet protocol operates using a carrier sense, multiple-access with collision detect (CSMACD) protocol by which end stations (e.g., workstations or other computers) first listen for carrier and wait for the network to become idle, then transmit the data, retransmitting the data if collisions are detected. Data is transferred in the form of packets, which contain the address of the sending station (the source address), the address of the intended recipient (the destination address) and a Cyclic Redundancy Check (CRC) of the packet. For more information on the Ethernet protocol, see the standard ISO/IEC 8802-3.

For higher bandwidth networks, multiple network segments are often used. These network segments can be interconnected through the use of one or more bridges or switches. The core functionality of switches and bridges are similar and the terms are often used interchangeably. Bridges contain two or more ports, each of which connect to an network segment. When two stations on different network segments communicate with each other, the bridge will forward the packets between the two segments. When the stations are on the same segment, the bridge will not forward the packets to any other segment.

Bridges learn on which port each station is connected by examining the source address of packets as the packets are received, and storing this address-port association in a filtering database. Bridges operate by examining the destination address of packets received on a given port, and forwarding the packet out the port on which the destination station is connected. If the destination station is on the port from which the packet was received, the packet is not forwarded (i. e., is filtered). For more information on bridges see the standard ISO/IEC 10038.

Network loops can be formed in many ways. For example, when two or more ports on a bridge become connected to the same network segment, a network loop exists. While in this configuration, all packets forwarded by the bridge to any one of its ports on a network segment will be received by all of the other ports that the bridge has on that network segment. The bridge will continue to re-forward and re-receive these packets, the rate and duration of which is bounded only by the limitations of the bridge and the network. Network loops can also be formed, for example, by two repeaters being improperly connected together. Regardless of how a network loop is formed, the result is wasted network bandwidth and wasted bridge resources.

The Spanning Tree Algorithm is the current method most often used to protect user networks from network bridge loops. The Spanning Tree Algorithm defines an algorithm and a protocol that network bridges can use to intercommunicate and then adjust their configurations such that a network is spanned, but does not cause network loops. For more information on the Spanning Tree algorithm, see the standard ISO/IEC 10038.

The Spanning Tree Algorithm adds additional traffic to the network and can only be implemented on network bridges/switches. Further, to be effective the Spanning Tree algorithm must be implemented in all of the network bridges in the network. This is due to the Spanning Tree algorithm not offering protection against network loops that exist on bridges that do not support the Spanning Tree Algorithm (i.e. many unmanaged bridges/switches). This limitation makes it impractical to incrementally implement the Spanning Tree Algorithm on an existing network that contains bridges that do not already support the Spanning Tree Algorithm.

Additionally, when a network administrator makes network connections within a network closet which results in an immediate and heavy increase in network traffic, as indicated by the activity/utilization light emitting diodes (LEDs) for the network, this indicates to the network administrator that potentially a network loop has been formed.

BRIEF SUMMARY OF THE INVENTION

In accordance with the preferred embodiment of the present invention, runtime detection of network loops is performed. It is detected when for a network segment a ratio of duplicate packets to total packets exceeds a first predetermined threshold. Also it is detected when traffic load on the network segment exceeds a second predetermined threshold. When the ratio of duplicate packets to total packets exceeds the first predetermined threshold and the traffic load on the network segment exceeds the second predetermined threshold, a network loop has been detected.

For example, in the preferred embodiment, the ratio of duplicate packets to total packets is detected by acquiring sampled packets from all network packets sent over the network segment. The sampled packets are used to generate packet identification statistics. The ratio of duplicate packets to total packets is calculated using the packet identification statistics.

For example, a cyclical redundancy check (CRC) is used to identify packets when generating packet identification statistics. Alternatively, the entire contents of each sampled packet are used to identify packets when generating packet identification statistics. In the preferred embodiment, only error free packets are eligible to be sampled packets.

In the preferred embodiment, the first predetermined threshold is equal to one half and the second predetermined threshold is equal to one half bandwidth for the network segment.

In alternate embodiments, instead of, or in addition to using a ratio of duplicate packets and traffic load to detect a network loop, other symptoms of network loop may be monitored. For example, broadcast and multicast traffic levels can be used as an indicator that a network loop is present. Also, a high collision rate level can be used as an indicator that a network loop is present. The present invention allows detecting of network loops which facilitates keeping a network operational in the event of a miss-configuration that results in a network loop. Such a miss-configuration resulting in a network loop can be catastrophic and result in significant down time for the network until the network loop can be discovered and ameliorated.

The present invention is superior over prior art solutions such as the Spanning Tree Algorithm because the present invention does not add traffic to a network and is thus unobtrusive. Devices that utilize network loop detection in accordance with the present invention can be incrementally implemented across a network, offering increasingly more benefits as more devices with network loop detection are installed. It is not necessary to implement network loop detection in accordance with the present invention on the device that contains the network loop for effectiveness. A device which incorporates network loop detection in accordance with the present invention can protect itself, and any nodes attached to it from a network loop induced on it, or on another device.

Also, the start-up delays resulting from the learning mode of the Spanning tree are obviated by the present invention. Further, operation of the present invention is completely transparent to the network administrator/user who does not even need to know that the network loop protection exists.

DETAILED DESCRIPTION OF THE PREFERRED EMBODIMENT

Figure 1:
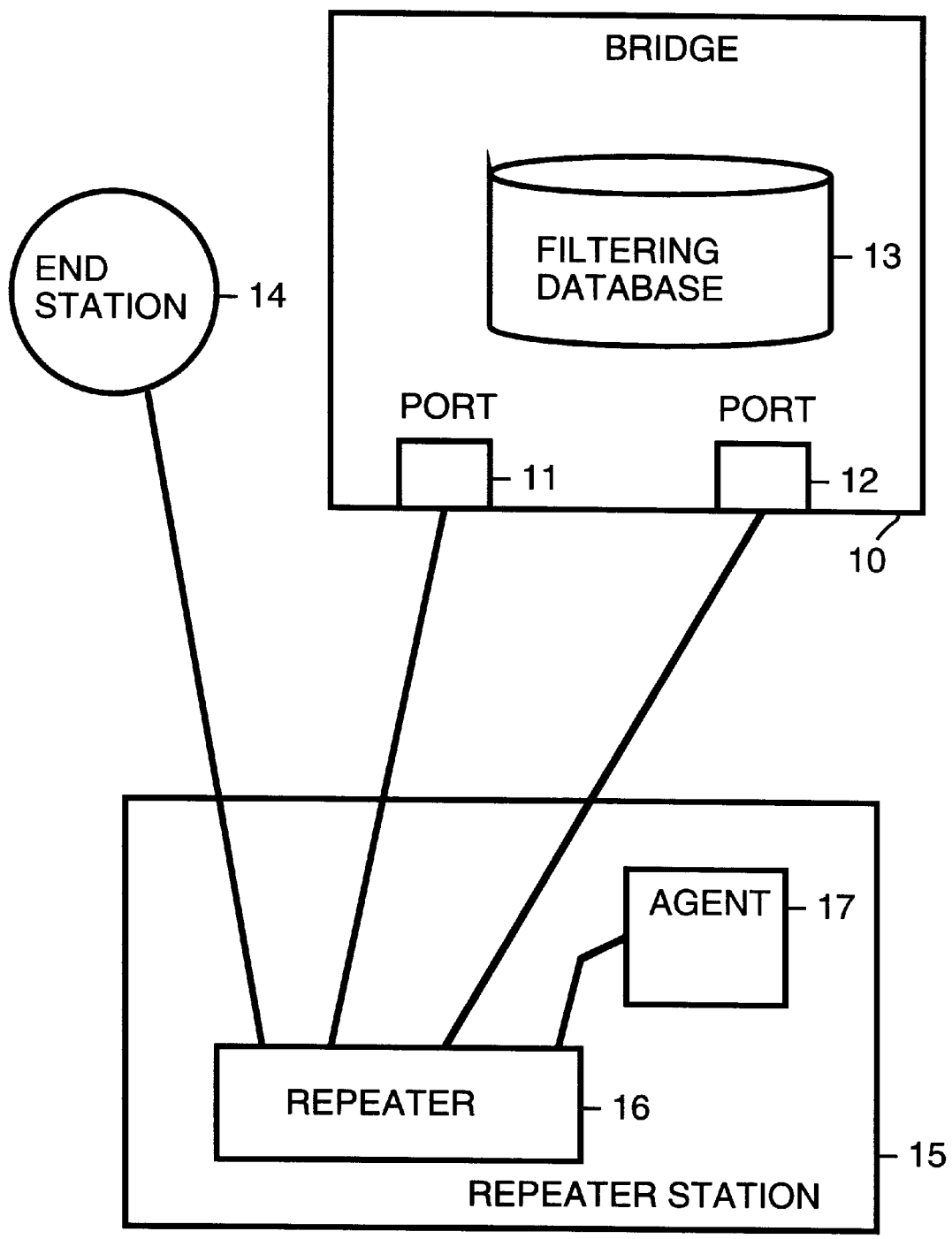
FIG. 1 is a simplified example of connections in a network illustrating a network bridge loop.

FIG. 1 shows a bridge 10. Bridge 10 includes a port 11, a port 12 and a filtering database 13. Bridge 10 learns the port on which each station is connected by examining the source address of packets as they are received, and storing this address-port association in filtering database 10. Bridge 10 operates by examining the destination address of packets received on a given port, and forwarding the packet out the port on which the destination station is connected. If the destination station is on the port from which the packet was received, the packet is not forwarded.

A repeater station 15 includes a repeater 16. Repeater is connected to an intelligent agent 17 within repeater station 15, an end station 14, port 11 of bridge 10 and port 12 of bridge 10. Since two ports of bridge 10 are connected to the same repeater, a network bridge loop exists. While in this configuration, all packets transmitted by bridge 10 on port 11 will be received on port 12 and re-transmitted on port 11. Likewise, all packets transmitted by bridge 10 on port 12 will be received on port 11 and re-transmitted on port 12. Bridge 10 will continue to re-receive these packets and to re-transmit these packets. The rate and duration of these transmissions is bounded only by the limitations of bridge 10 and repeater station 15. The result is wasted network bandwidth, wasted bridge resources, and likely the loss of network usefulness.

Figure 2:
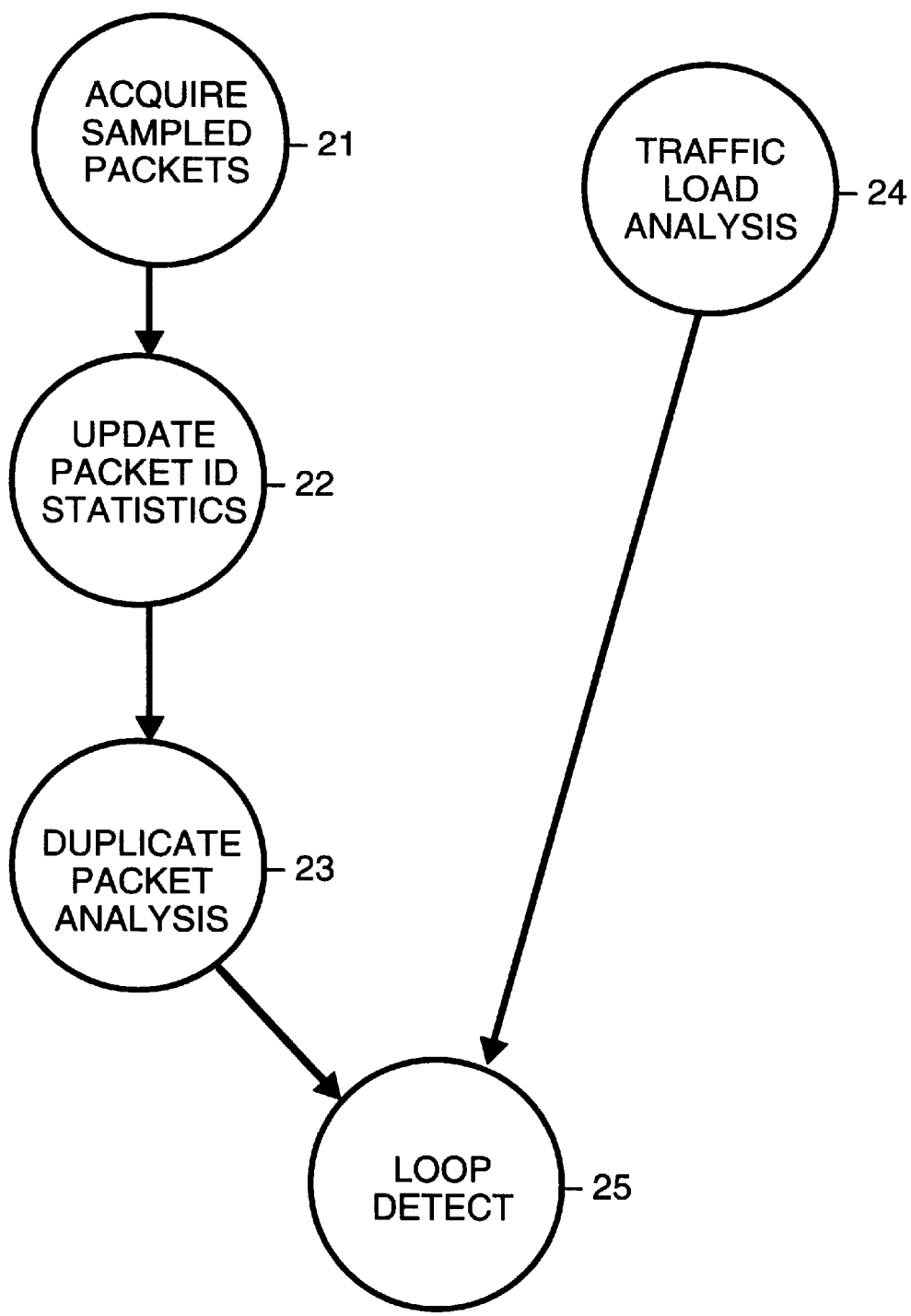
FIG. 2 illustrates the implementation of runtime detection of network loops in accordance with a preferred embodiment of the present invention.

FIG. 2 illustrates the implementation of runtime detection of network loops such as those illustrated by FIG. 1. In order to detect loops, the network loop detection illustrated by the flowchart shown in FIG. 2 looks for two symptoms of a network loop. The first symptom is packets that have been transmitted multiple times. Such a high number duplicate packets will occur when there is a network loop. The second symptom is high network traffic load. While these are the two symptoms searched for by the preferred embodiment of the present invention, other symptoms may be searched for as well. For example, other symptoms of a network loop which can be searched for include high broadcast and multicast traffic levels and high collision rates.

In order to look for duplicate packets, an acquire sample packets process 21 samples network traffic. As input, sample packets process 21 receives all packets (Network_Traffic) which appears on the network segment. As output, sample packets process 21 produces sampled packets (Sampled_Packets). The algorithm sample packets process 21 performs is to select a portion of error-free packets from the packets (Network_Traffic) transferred over to be used as sample packets (Sampled_Packets). In alternative embodiments of the present invention, packets with errors can still be used as sample packets.

The sampled packets (Sampled_Packets) are forwarded to an update packet identification (ID) statistics process 22. Update packet identification statistics process 22 derives a packet identifier for each sampled packet. In the described preferred embodiment, update packet identification statistics process 22 uses the Cyclic Redundancy Check (CRC) within each sampled packet as the packet ID. Other data from the packet or even the entire packet could also be used as a packet ID.

Update packet identification statistics process 22 generates packet identification statistics (Packet_ID_Statistics) for the sampled packets. Table 1 below sets out pseudo-code which implements update packet identification statistics process 22:

TABLE 1

```
Process:    Update packet identification statistics process 22
Inputs:     Sampled_Packets
Outputs:    Packet_ID_Statistics
Algorithm:
    FOR each Sampled_Packet DO
        IF sample_count is below MAX_SAMPLES
            increment sample_count by 1
            SET Packet ID to Packet CRC
            scan Packet_ID_Statistics to see if ID has
                already been sampled
            IF not already sampled
                WITH Packet_ID_Statistics DO
                    insert ID
                    set occurrences of ID to 1
                END_WITH
            END_IF
            ELSE
                WITH Packet_ID_Statistics DO
                    increment occurrences of ID
                END_WITH
            END_ELSE
        END_IF
    END_FOR
```

Update packet identification statistics process 22 passes packet identification statistics (Packet_ID_Statistics) to a duplicated packet analysis process 23. Duplicated packet analysis process 23 analyzes the packet identification statistics to see if there exists a reasonable expectation that a significant number of packets have been sampled more than once. If so, duplicated packet analysis process 23 sends notification (High_Duplicate_Packet_Ratio) to a top level loop detect process 25. Table 2 below sets out pseudo-code which implements duplicated packet analysis process 23:

TABLE 2

```
Process:    Duplicated packet analysis process 23
Inputs:     Packet_ID Statistics
```

TABLE 2-continued

```
Outputs:    High_Duplicate_Packet_Ratio
Algorithm:
    IF not collected enough samples to be valid
        SET High_Duplicate_Packet_Ratio to FALSE
    END_IF
    ELSE
        set num_duplicates to 0 (zero)
        FOR each Packet ID in Packet_ID_Statistics DO
            IF occurrences of ID is greater than 1
                increment num_duplicates by number of
                    occurrences of ID
            END_IF
        END_FOR
    END_ELSE
    IF num_duplicates is greater than 1/2 of sample_count
        SET High_Duplicate_Packet_Ratio to TRUE
    ENDIF
    ELSE
        SET High_Duplicate_Packet_Ratio to FALSE
    END_ELSE
```

A traffic load analysis process 24 looks for high network traffic loads. To do so, traffic load analysis process 24 reads, on a periodic basis, segment counters (Network_Octet_Counter) that measure the number of octets (bytes) that have been transmitted on a network segment. From the count in the network counters traffic load analysis process 24 derives a measure of traffic load (traffic_rate). When traffic load on the network segment is above a pre-determined threshold, traffic load analysis process 24 forwards a high traffic indication (High_Traffic_Load) to top level loop detect process 25.

Table 3 below sets out pseudo-code which implements traffic load analysis process 24:

TABLE 3

```
Process:    Traffic load analysis process 24
Inputs:     Network_Octet_Counter
            System_Time
Outputs:    High_Traffic_Load
Algorithm:
    SET delta_octets to
        Network_Octet_Counter - Prev_NetworkOctetCounter
    SET Prev_NetworkOctetCounter to Network_Octet_Counter
    SET delta_time to System_Time - Prev_System_Time
    SET Prev_System_Time to System - Time
    SET traffic_rate to delta_octets / delta_time
    IF traffic_rate is greater than 50% of network bandwidth
        SET High_Traffic_Load to TRUE
    END_IF
    ELSE
        SET High_Traffic_Load to FALSE
    END_ELSE
```

Top level loop detect process 25 will declare (Loop_Detected=TRUE) that a network loop exists whenever a network segment has a significant number of duplicate packets and is also experiencing high traffic loads. When network loop detection is implemented on bridge 10, and in the event that a network loop does exist, and the network loop exists on bridge 10, bridge 10 can reconfigure itself to eliminate the network loop. If the network loop exists on some other device, bridge 10 can disconnect itself from the offending device to protect itself and any other devices connected to bridge 10 from the effects of the network loop. Network loop detection can also be implemented on repeater station 15 to protect repeater station 15 and any other devices connected to repeater station 15 from the effects of a network loop.

Table 4 below sets out pseudo-code which implements top level loop detect process 25:

TABLE 4

```
Process:    Top level loop detect process 25
Inputs:     High_Traffic_Load
            High_Duplicate_Packet_Ratio
Outputs:    Loop_Detected
Algorithm:
    IF High_Traffic_Load is TRUE and
    High_Duplicate_Packet_Ratio is
        TRUE
        SET Loop_Detected to TRUE
    ENDIF
    ELSE
        SET Loop_Detected to False
    END_ELSE
```

In an alternative embodiment, a Loop_Detect_Procedure and a Duplicate_Detect_Procedure monitors network traffic and the ratio of duplicate packets to detect network loops. Pseudo code for this embodiment is set out in Table 5 below.

TABLE 5

```
Loop_Detect_Procedure:
While forever Do
    For all segments being analyzed
        If transmitted octets on this segment in the last
                second is greater than programmable
                threshold (70–100%)
            Call Duplicate_Detect_Procedure
            If High_Duplicate_Packet_Ratio
                Declare loop
    End_While
Duplicate_Detect_Procedure:
Inputs:     Segment
Outputs:    High_Duplicate_Packet_Ratio
//***Note:  This example is configured for 10 megabit ***//
Set Max_Run_Time to 8 sec.
Set Min_Loop_Rate to 812 Packets/sec
Set Max_Packets_To_Analyze to 16384
Set Max_IDs_To_Track_In_Data_Base to 128
Set Min_Certainty_Ratio_To_Declare_Duplicates To 1/8
Set Min_Analyzed_Packets_To_Form_A_Conclusion to
    (Max_Run_Time * Min_Loop_Rate)/2
Clear all packet statistics in Data Base
//*** Collect consecutive packets from the network***//
While   Run_Time is less than Max_Run_Time and
        Number_of_Analyzed_Packets is less than
                Max_Packets_To_Analyze
Do
    Collect the next packet from the segment to be analyzed
    Increment Number_of_Analyzed_Packets
    Set Packet_ID to the packets CRC
    If Packet_ID is already in Data_Base
        Increment the occurrences for this Packet_ID in the
            Data_Base
    Else_If Number_Of_IDs_In_Data_Base is less than
            Max_IDs_To_Track_In_Data_Base
        Store Packet ID in Data_Base and set its number of
            occurrences to 1
End While
//*** Analyze duplicate data ***//
If Number_of_Analyzed_Packets is less than
        Min_Analyzed_Packets_To_Form_A_Conclusion
    Set High_Duplicate_Packet_Ratio to FALSE
Else
    Set Number_Of_Duplicate_Packets_Seen to 0
    Set Number_Of_Duplicate_IDs_In_Data_Base to 0
    For each Packet_ID in Data_Base
        If Occurrences of Packet_ID is greater than 1
            Add Occurrences of Packet_ID to
                Number_Of_Duplicate_Packets_Seen
            Increment
                Number_Of_Duplicate_IDs_In_Data_Base
    End_For
    Set Packet_Based_Certainty to the ratio of
            Number_Of_Duplicate_Packets_Seen to
```

TABLE 5-continued

```
         Number_of_Analyzed_Packets
Set ID_Based_Certainty to the ratio of
         Number_Of_Duplicate_IDs_In_Data_Base to
         Number_Of_IDs_In_Data_Base
If Packet_Based_Certainty + ID_Based_Certainty is
    greater than or equal to
         Min_Certainty_Ratio_To_Declare_Duplicates
    Set High_Duplicate_Packet_Ratio to TRUE
Else
    Set High_Duplicate_Packet_Ratio to FALSE
```

Network configurations can be very complex as hundreds of devices can be connected together in a network using a single network closet. Network loops can arise from a variety of different types of network connections.

Figure 3:
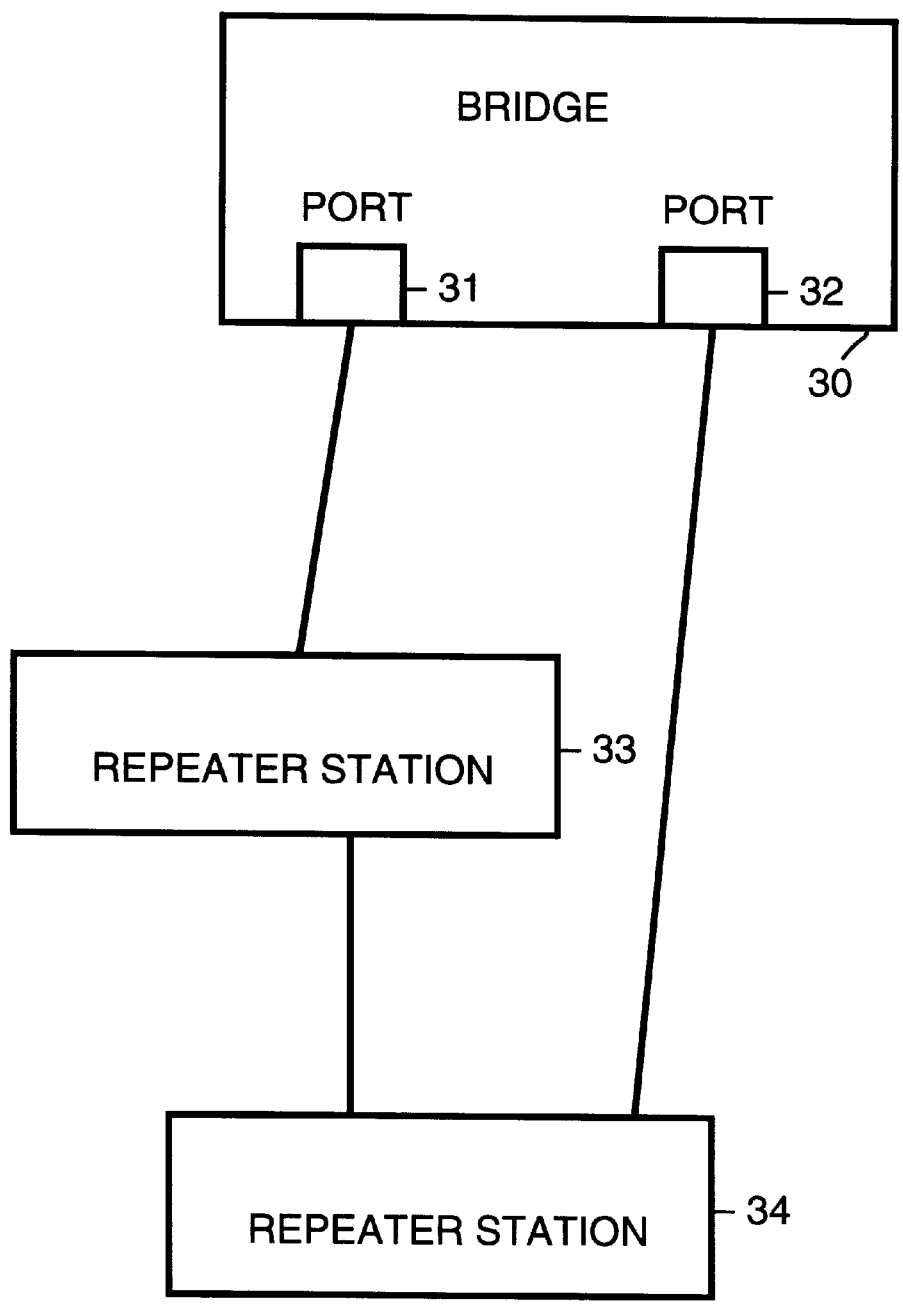
FIG. 3 and FIG. 4 illustrate network loops arising from various network connection configurations within a network.

For example, a network loop can arise when two ports of a network bridge are connected together through one or more repeaters. This is illustrated, for example, by FIG. 3 which shows a port 31 of a bridge 30 being connected in a network loop with a port 32 through a repeater station 33 and a repeater station 34.

Figure 4:
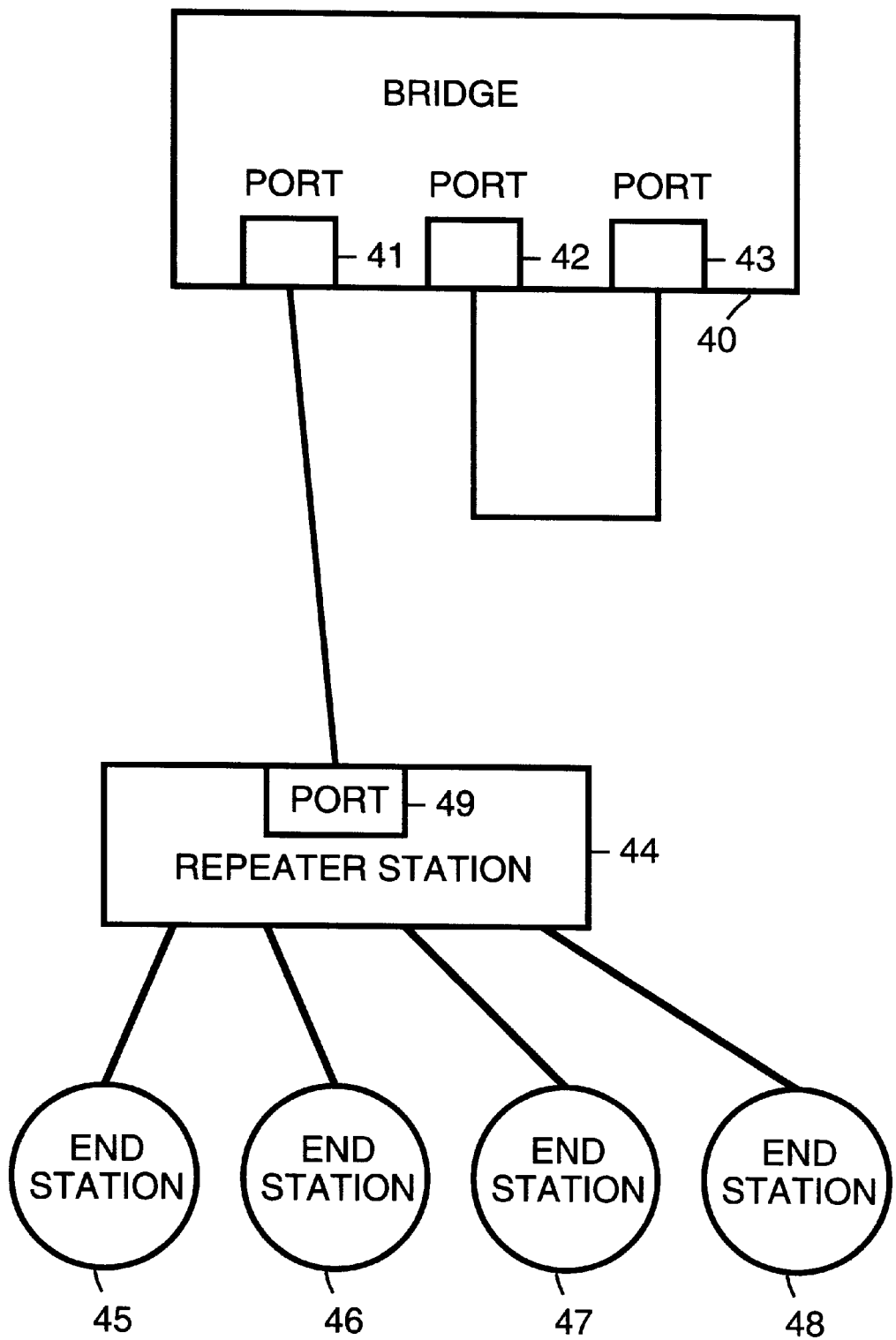

A network loop can also arise when two ports of a network bridge are connected together even when no repeater stations are included in the network loop. This is illustrated, for example, by FIG. 4 which shows a port 42 of a bridge 40 being directly connected with a port 43 of bridge 40 to form a network loop. A repeater station 44, connected to a port 41 of bridge 40, is not part of the network loop. Connected to repeater station 44 are an end station 45, an end station 46, an end station 47 and an end station 48. In accordance with the preferred embodiment of the present invention, repeater station 44 can detect the network loop caused by port 42 and port 43 of bridge 40 being connected together. Upon detection of the network loop, repeater station 44 can isolate itself from the loop by shutting off a port 49. By isolating itself from the network loop, repeater station 44 also isolates end stations 45 through 48 from the network loop.

The foregoing discussion discloses and describes merely exemplary methods and embodiments of the present invention. As will be understood by those familiar with the art, the invention may be embodied in other specific forms without departing from the spirit or essential characteristics thereof. For example, bridge 10 and repeater station 15 can operate with networks other than local area networks which operate in accordance with the Ethernet protocol. For example, in alternate embodiments of the present invention, the loop occurs in a network that operates in accordance with the FDDI protocol or any other network protocol set out in the IEEE 802 family of networking standards (e.g., 802.3, 802.5, etc.). Accordingly, the disclosure of the present invention is intended to be illustrative, but not limiting, of the scope of the invention, which is set forth in the following claims.

We claim:

1. A method for runtime detection of network loops comprising the following steps:
    (a) detecting when, for a network segment, a ratio of duplicate packets to total packets exceeds a first predetermined threshold;
    (b) detecting when traffic load on the network segment exceeds a second predetermined threshold; and,
    (c) when in step (a) it is detected that a ratio of duplicate packets to total packets exceeds the first predetermined threshold and in step (b) it is detected that the traffic load on the network segment exceeds the second predetermined threshold, indicating that a network loop has been detected.

2. A method as in claim 1 wherein step (a) includes the following substeps:
    (a.1) acquiring sampled packets from all network packets sent over the network segment;
    (a.2) using the sampled packets to generate packet identification statistics; and,
    (a.3) calculating the ratio of duplicate packets to total packets using the packet identification statistics.

3. A method as in claim 2 wherein in substep (a.2) a cyclical redundancy check is used to identify packets when generating packet identification statistics.

4. A method as in claim 2 wherein in substep (a.2) entire contents of each sampled packet are used to identify packets when generating packet identification statistics.

5. A method as in claim 1 wherein in step (a) the first predetermined threshold is equal to one half.

6. A method as in claim 1 wherein in step (b) the second predetermined threshold is equal to one half bandwidth for the network segment.

7. A device for runtime detection of network loops comprising:
    first detection means for detecting when a ratio of duplicate packets to total packets exceeds a first predetermined threshold for a network segment;
    second detecting means for detecting when traffic load on the network segment exceeds a second predetermined threshold; and,
    indication means for indicating that a network loop has been detected when the first detecting means detects that a ratio of duplicate packets to total packets exceeds the first predetermined threshold the second detection means detects that the traffic load on the network segment exceeds the second predetermined threshold.

8. A device as in claim 7 wherein the first detection means includes:
    an acquiring process which acquires sampled packets from all network packets sent over the network segment;
    a generating process which generates packet identification statistics from the sampled packets acquired by the acquiring process; and,
    a calculating process which calculates the ratio of duplicate packets to total packets using the packet identification statistics.

9. A device as in claim 8 wherein the generating processes uses a cyclical redundancy check to identify packets when generating packet identification statistics.

10. A device as in claim 8 wherein the generating processes uses entire contents of each sampled packet to identify packets when generating packet identification statistics.

11. A device as in claim 7 wherein the first predetermined threshold is equal to one half.

12. A device as in claim 7 wherein the second predetermined threshold is equal to one half bandwidth for the network segment.

13. A method for runtime detection of network loops comprising the following steps:
    (a) detecting when, for a network segment, a plurality of indicators have each exceeded predetermined thresholds; and
    (b) when in step (a) all of the plurality of indicators have each exceeded predetermined thresholds, indicating that a network loop has been detected.

14. A method as in claim 13 wherein in step (a) the plurality of indicators includes broadcast and multicast traffic levels exceeding a predetermined threshold.

15. A method as in claim 13 wherein in step (a) the plurality of indicators includes high collision rate level exceeding a predetermined threshold.

16. A method as in claim 13 wherein in step (a) the plurality of indicators includes duplicate packets exceeding a predetermined threshold.

17. A method as in claim 13 wherein in step (a) the plurality of indicators includes traffic load exceeding a predetermined threshold.

18. A computer implemented method for runtime detection of network loops comprising the following steps:

(a) detecting by a computing system when, for a network segment, a performance indicator has exceeded a predetermined threshold; and (b) when in step (a) the performance indicator has exceeded the predetermined threshold, noting that a network loop has been detected.

19. A method as in claim 18 wherein in step (a) the performance indicator is one of the following:

broadcast and multicast traffic levels exceeding a predetermined threshold;

high collision rate level exceeding a predetermined threshold;

duplicate packets exceeding a predetermined threshold; and, traffic load exceeding a predetermined threshold.

* * * * *